3,725,089
SMALL PARTICLE DISPERSION COATING COMPOSITION

John C. Zola, 2662 10th Ave., Arcadia, Calif. 91006
No Drawing. Continuation of abandoned application Ser. No. 836,227, June 23, 1969, which is a continuation-in-part of application Ser. No. 609,769, Jan. 17, 1967, now Patent No. 3,458,329, dated July 29, 1969, and application Ser. No. 609,789, Jan. 17, 1967, being a continuation-in-part of application Ser. No. 104,211, Apr. 20, 1961, now abandoned. This application Jan. 19, 1971, Ser. No. 107,865

Int. Cl. B01f 3/08; C09d 5/18
U.S. Cl. 106—15 FP          11 Claims

ABSTRACT OF THE DISCLOSURE

A substantially odor-free coating composition that produces thicker coatings of greater power of concealment in one-coat applications than heretofore has been possible, without the coatings so applied sagging on vertical surfaces or wrinkling on horizontal surfaces. The coating composition of the present invention includes a plurality of colored particles of an aqueous film former, the major portion of which particles are less than 25 microns in size, dispersed in an aqueous dispersing phase. This coating composition may be intermixed with:

(1) dispersions of another color to produce richer color effects than possible with conventional prior art coating compositions,
(2) dispersions of larger particle sizes to produce visible multicolor effects, and the composition may be dried and applied to a desired surface in that form, or the dried composition may be reconstituted by the addition of water thereto.

CROSS-REFERENCE TO RELATED APPLICATION

The present application is a continuation application of application Ser. No. 836,227, June 23, 1969, now abandoned. Application Ser. No. 836,227 is in turn a continuation-in-part application of application Serial No. 609,769 filed Jan. 17, 1967, entitled "Aqueous Multicolor Coating Compositions and Preparation Thereof," that issued as Patent No. 3,458,329 on July 29, 1969. Application Ser. No. 609,789, filed Jan. 17, 1967, is a continuation-in-part of application Ser. No. 104,211 filed Apr. 20, 1961 that is now abandoned.

BACKGROUND OF THE INVENTION

Field of the invention

Small particle dispersion coating compositions, and the like.

Description of the prior art

An inherent limitation of conventional prior art coating compositions employing either aqueous or organic solvents, is that they are adapted primarily for use in producing thin films of one color. Such thin one-color films often are unsatisfactory, for both the concealment qualities and durability thereof are proportional to the applied thickness of the coating. In order to provide the required concealment and durability properties with conventional coating compositions of the type described, two or more coats thereof are often applied. If attempts are made to apply thicker coatings with coating compositions available in the past by a single application, the coatings tend to sag on vertical surfaces, while on horizontal surfaces, wrinkling or alligatoring may occur.

Means of overcoming these difficulties by providing textured or multicolor coatings in one-coat applications have been disclosed in my prior U.S. Pat. No. 2,591,904 and my co-pending application Ser. No. 609,769. These disclosures present two alternative means of providing textured or multicolored coatings by a one-coat application. In said Pat. No. 2,591,904 the disclosure is made of a primary film former that is dissolved in water-immiscible organic solvents and dispersed in water with the aid of suspension stabilizers. In said application Ser. No. 609,-769, water thinnable film formers are described which are rendered substantially immiscible or insoluble in a second aqueous phase by means of insolubilizing systems which consist essentially of, (1) a hydrophilic colloid, and
(2) an insolubilizing agent for said hydrophilic colloid.

These disclosures were directed primarily to the production of visibly heterogeneous coatings, and to coating compositions containing particles of visible dimensions. While the compositions of these inventions have made possible the application of very thick films in a single application, they also require moderately thick films to provide adequate coverage of the substrate.

The present invention wherein the major portion of the dispersed particles are less than 25 microns in size, provides the following results which are unattainable with conventional compositions of the type described:

(1) Produces thicker coatings in one-coat applications,
(2) May be intermixed with dispersions of another color to produce richer color effects than possible with conventional coating compositions,
(3) May be intermixed with dispersions of large particle size to produce visible multicolor effects, and
(4) May produce dry powder composites for reconstitution or for application as such.

SUMMARY OF THE INVENTION

A substantially odor-free coating composition that includes a plurality of colored particles of an aqueous film former, the major portion of which particles are less than 25 microns in size, which are dispersed in an aqueous dispersing phase. If desired, a second aqueous film former may be included as a part of the dispersing phase.

It is an object of the present invention to provide aqueous coating compositions which have a variety of unique properties and comprise aqueous dispersions of discrete, aqueous, film forming agglomerates, the majority of which are smaller than 25 microns in size, but are larger than colloidal dimensions.

It is another object of the present invention to provide such coating compositions in which water thinnable, organic or inorganic film forming materials constitute the primary film former of the discrete dispersed agglomerates.

A further object of the present invention is to improve the covering ability of relatively thin films of aqueous multicolor coatings by using as one component thereof, a dispersion of discrete aqueous film forming agglomerates, the majority of which are smaller than 25 microns in size.

Sitll a further object of the present invention is to provide a simple means for preparing dry coating powders by forming aqueous dispersions of discrete aqueous film forming agglomerates, the majority of which are smaller than 25 microns in size, and then drying the same.

Other objects and advantages will appear hereinafter.

DESCRIPTION OF THE PREFERRED EMBODIMENTS

The means of providing phase separation employed in the present invention is the same as that disclosed as one aspect of my co-pending U.S. Ser. No. 609,769. According to this method, an aqueous film forming composition or component thereof is intermingled with an aqueous hydrophilic colloid. By means of an appropriate insolubilizing agent for the hydrophilic colloid, the film forming composition is rendered substantially insoluble in a second aqueous phase, and is dispersed therein as discrete, film forming agglomerates, the composition, color, size, and consistency of which are widely variable and controllable.

By the terms "aqueous film forming composition" and "component of aqueous film forming composition" I refer to materials known in the art as useful in aqueous film forming compositions. These include water thinnable film formers such as organic resin latices and emulsions, water dispersible oils, water reducible solutions of natural and synthetic polymers and natural polymer derivatives, water soluble alkali silicates and water dispersible ceramic compositions, as well as colorants, extender pigments, and various modifying agents commonly used as required in minor proportions, such as driers, coalescing agents, plasticizers, anti-foam agents, etc. Also included as components are the somewhat less commonly used materials, sand, glass beads or fibers, metallic powders, flakes or fibers, and cellulose and asbestos fibers.

In the broadest aspect, the present invention and co-pending U.S. Ser. No. 609,769 are unique in providing a simple means for preparing aqueous dispersions wherein the dispersed entities themselves are water based coating compositions whose essential properties are kept substantially intact. The water thinnable film forming compositions which can be re-dispersed by the present methods include both aqueous dispersions and aqueous solutions.

The film forming dispersions, for example, may comprise a finely divided solid polymer as the coating binder, along with dispersed colorants, extender pigments, and other coating ingredients such as coalescing agents, antifoam agents, bactericides, etc. According to the present methods, the components of such dispersions are agglomerated as a whole into larger entities, substantially uniform in composition, which are surrounded by a second aqueous phase. The new dispersions, however, are uniquely different from the initial film forming composition in that the particle size of the film forming entities is now widely variable. Also, the film forming components are effectively bound together within each particle, rather than loosely suspended in a common medium.

Alternatively, the basic film forming binder may be substantially water soluble, such as an alkali silicate or a water thinnable organic polymer solution. According to the present method of forming aqueous dispersions, a solution coating can be converted into a dispersion coating, which offers many advantages. For example, very viscous solutions can be used in the agglomerated, dispersed entities, while maintaining a relatively low viscosity in the resulting dispersion. Also, by mixing the present dispersions, satisfactory coating compositions can be prepared in which some of the dispersed, agglomerated entities contain a film former different from that of others, which film formers on intermixing in the solution state would not be compatible with one another. By use of heterogeneous dispersions of this kind, unique film properties are attainable which would not be possible with conventional solution coatings.

As will be shown hereafter, other advantages arise when either solution or dispersion coatings are re-dispersed according to the present methods.

In some applications, such as where water sensitivity of the film is acceptable, the agglomerating hydrophilic colloid itself may constitute the film forming binder, as well as providing means for attaining the required immiscible phases.

A particular merit of the present compositions is the variability in size of the dispersed aqueous agglomerates.

In the parent invention, the variety of multicolor effects is partly related to the range in size obtainable with particles of visible dimensions. In the present invention, one of the advantages is related to the variation in properties obtainable by variation in size of particles which are too small to be visually distinguishable from one another.

Some of the properties particularly related to particle size are: film thickness of deposited material, hiding of the substrate, tendency to sag in vertical position, force required for spreading by brush, and porosity of the dry film. As the particle size is increased beyond that of the elements of the coating composition, films of greater thckness can be deposited without sagging, brush drag is reduced, and film porosity increases. As will be apparent to those skilled in the art, variation in particle size provides a new and effective formulating tool for control of fundamental coating properties. In particular, the present small particle dispersions permit the formulation of coating compositions which can be applied at moderate thickness with good coverage, without appreciable sagging, and requiring considerably less force for brushing than latex or solution coatings having comparable coverage and sag resistance. To obtain a balance of novel properties advantageous for particular applications, the present compositions can also be used effectively by intermixing with ordinary latex or solution coatings.

In a second aspect, the advantages of the present invention are related to the use of small particle dispersions in combination with similar dispersions of large particles designed to produce a multicolor coating.

In the production of multicolor films, superior definition and color contrast are obtained when the areas defined by each color are formed by particles which are relatively large and similar in size to particles of other colors. For example, patterns of high contrast are obtainable when the majority of particles have dimensions of several millimeters. When good coverage is required at relatively low film thickness, the average particle size of one or more colors must be reduced; alternatively, large particles may be used in combination with a dispersing phase which comprises a conventional latex or solution paint having good hiding properties.

The latter alternative has both advantages and disadvantages. Aside from good covering at low film thickness, it has the advantage of improving application properties when application is made by brush or roller. While dispersions containing only large particles are readily applied by spraying, they are difficult to apply as a continuous film without blank spots or "holidays." The disadvantage of using a conventional latex or solution coating is that on application it tends to overlay the dispersed globules, reducing the clarity and color contrast of the resulting film.

I have found that not only good hiding at low film thickness, but also good brushing or roller coating properties can be obtained by using in place of a solution or latex paint a small particle dispersion coating prepared according to the present invention. Surprisingly, it has also been found that small colored particles a few microns in diameter exhibit less hiding of the larger colored particles than that shown by the non-agglomerated pigment particles of conventional latex or solution paints. Small particle dispersions of the present invention are therefore useful in obtaining good color contrast in combination with good coverage and application properties.

As the average particle size of the small particle dispersion is increased, both coverage of the substrate and obscuration of other colors is reduced. The optimum size is therefore dependent on that required for good hiding at the desired film thickness. In combination with large particle dispersions designed to produce multicolor coatings, the superiority of the present small particle dispersions over conventional coatings may result in part from the novel ability to control hiding by means of particle size rather than through pigment content alone.

In a third aspect of the present invention, unique decorative effects are attained by use of small particle dispersions which comprise particles of different colors rather than a single color. In this circumstance, when the particles are predominantly smaller than 25 microns in size, distinct color contrasts are not observed, but the appearance is substantially different from comparable blends of differently colored latex or solution coatings.

The effect produced by blending small particle dispersions of different color is more vibrant in character, and varies in appearance with the degree of difference between the colors mixed. For example, two colors which are nearly complementary will produce a greater softening of the overall-hue than two colors which are nearly identical. By appropriate selection of the colors to be mixed, subtle effects are obtained which are difficult, if not impossible, to secure by blending paints or pigments in the conventional manner. The effects provided by the present methods are especially suitable for architectural applications, where colors of high brightness and low saturation are often sought.

If the method of application is one which involves some degree of shear, such as brushing or doctoring, small particle dispersions can also produce distinctly multicolor effects by alignment of particles, or shearing of particles, or both. This results from the well known fact that the minimum angle of visual acuity for linear elements is smaller than that for dots. By variation in particle consistency, the desired degree of spreading can be obtained upon brushing or other method of shearing application. Either distinct striping effects or a slight accentuation of monotone effects can thus be attained.

In a fourth aspect, the small aqueous dispersions of the present invention are advantageous in the production of dry coating materials.

In dry coating technology finely divided, dry film forming compositions are applied by various means such as dry spraying, flame spraying, electrostatic deposition, and fluidized bed coating, with application of heat at some point in the process to induce coalescence of the film forming particles. By this method, thick coatings are readily applied, but the requirement for thermoplasticity has made it difficult to produce dry powders sufficiently fine to permit the application of coatings thinner than about 5–10 microns.

Conventionally, composite film forming powders for dry application are produced primarily by two methods: (1) Spray drying of a conventional liquid coating composition formulated with organic solvents. This method can provide powders of fine particle size, but is costly because of the large volume of organic solvents which is commonly required, and which is lost by volatilization. (2) The more commonly employed melt method, wherein the powder ingredients are milled at an elevated temperature with high shearing pressure until completely dispersed in one another. Such melt mixtures are reduced to powder by cryogenic grinding and selective screening. Since the thermoplastic binders are typically tough and gummy, particles smaller than 50 microns in size are difficult to obtain. This method involves expensibe machinery and high production costs, and is limited to coating binders having a relatively high softening point.

By the method of the present invention, subdivision to a size of 5 microns or less is readily achieved with a minimum of energy expenditure by use of relatively fluid compositions, which on dispersion in the second aqueous phase can be broken down by simple stirring. Conversion to dry powder is then completed by a conventional drying operation.

As disclosed in U.S. Ser. No. 609,769, finely divided dry powders prepared according to the present invention can also be made suitable for reconstitution to form a liquid coating material on addition of an appropriate aqueous medium.

The processes of the present invention are applicable, not only to complete coating materials, but also to any of their components taken separately. They are particularly valuable in the production of a dry, powdered, non-dusting form of colorants or difficultly dispersible extender pigments for easy incorporation in aqueous coating compositions of either the present or conventional types.

In the following respects, the advantages of the present invention are not closely related to particle size, but are dependent on the disclosed process of forming aqueous dispersions of aqueous film forming materials which is common to both parent application and the present continuation-in-part. In circumstances of use where large globules are not specifically advantageous, it is probable that greater convenience in preparation and application will favor the use of dispersions in which a majority of the dispersed particles are smaller than 25 microns.

In certain applications, advantages result from the capability of forming heterogeneous dispersions wherein the discrete particles differ from one another in chemical composition, such as in comprising different film forming polymers or extender pigments.

To some extent, latices of different composition have been mixed heretofore, but the intent has been to obtain a homogeneous blend of properties rather than a distinct heterogeneity. Furthermore, it has not been possible to prepare aqueous dispersions wherein the dispersed entities are units of complete film forming compositions rather than components of such compositions. This capability, provided by the present invention, is believed to be especially valuable in the field of adhesives.

A specific advantage of the present invention is related to the use of a particular type of film former, and is apparently attributable to the presence of the insolubilizing systems used to render the discrete film forming agglomerates insoluble in the aqueous dispersing phase.

The water soluble alkali silicates are economical film formers, but have not been used extensively because of their tendency to opacify and chalk after short or long periods of exposure to the air. This is presumably due to formation of carbonates from contact with carbon dioxide, and is known to be ameliorated by drying procedures which inhibit or reduce the rate of water release from the coating composition.

The present compositions comprising hydrophilic colloids in combination with an alkali silicate have been found unexpectedly to reduce or eliminate this tendency to deteriorate on aging in air, even after a period of several years. The reason for this improved behavior is uncertain, but may be related to the tenacious retention of water by hydrophilic colloids. While some of these have been used heretofore as plasticizers of silicate films, they have not been known to solve the aging problem. It is believed that the improved behavior of the present compositions may be attributable to the formation of physical or chemical complexes between hydrophilic colloids and inoslubilizing agents, which have been observed to increase their water retentiveness.

The following examples illustrate the agglomeration of aqueous coating materials to produce aqueous film forming dispersions wherein the major portion of dispersed material is in the form of particles larger than colloidal dimensions, but smaller than 25 microns. They exemplify the use of four representative types of water thinnable film formers:

(1) a water thinnable alkyd resins, which is typical of a wide range of the so-called water soluble or water dispersible synthetic resins (Example I),
(2) an inorganic film forming water solution of an alkali silicate (Example II),
(3) an acrylic latex, which is typical of a wide variety of film forming homopolymer and copolymer aqueous emulsions (Example III),
(4) a starch coating, representative of film forming hydrophilic colloids which are commonly used in certain applications without the addition of other aqueous film formers (Example IV).

As shown in the parent application, inorganic filming dispersions, such as water dispersed ceramic frit, can be agglomerated in the same manner as organic latices. At present, however, the inorganic dispersions most frequently used employ basic particles which are predominantly larger than 25 microns.

For many applications, such as acoustical ceilings, paper coatings, etc., appropriate hydrophilic colloids provide adequate physical characteristics to be useful as film formers in low cost coating formulations. In Example IV, starch constitutes the film forming binder as well as the required agglomerating hydrophilic colloid. When one type of film former serves this dual purpose, it is sometimes advantageous to employ a combination of two or more grades or modifications thereof, in order to provide the desired characteristics.

Examples V, VI, and VII illustrate the use of the present dispersions in combination with other types of aqueous coatings. In Example V the supplementary coating material is a dispersion comprising predominantly particles larger than 25 microns. In Examples VI and VII it is a conventional aqueous film former, such as those used as starting materials to produce the dispersions of the present invention.

Example VIII illustrates the unique effects obtainable by mixing two of the present small particle dispersions when the particles of one dispersion are different in color from those of the other.

In the present examples, preferred insolubilizing systems have been employed in order to favor the maximum containment of film former within the dispersed particles and to facilitate the size reduction of dispersed material with simple stirring equipment. As indicated in the parent application, however, a wide variety of insolubilizing systems are potentially useful, and may be preferred with other film formers or different dispersing equipment.

As the agglomerating hydrophilic colloid, the present examples employ natural gums or natural gum derivatives which are insolubilized by water soluble borates, such as sodium or ammonium borate. Several types of siliceous materials are also used as insolubilizing agents for the hydrophilic colloid. These include both colloidal silicates and extender pigments of larger particle size commonly used in coating compositions, such as china clay and talc. While the latter are less effective on a percentage basis than the colloidal materials, they are useful as auxiliary agents in compositions where this kind of pigmentation is normally usable in appreciable proportions.

In the agglomeration of aqueous film formers to produce aqueous dispersions, insolubilizing agents may often be absorbed to some degree by the agglomerated materials. This is particularly true of the present small particle dispersions where the surface area is relatively large. In some instances the examples indicate the further addition of siliceous insolubilizing agent after the initial dispersion has been formed. This is done to facilitate the further breaking down of particles, and/or to reduce the tendency for dispersed particles to cluster with one another.

As indicated hereinabove, one of the applications of the present small particle dispersions is to provide one color of a multicolor coating composition. This is pointed out in detail in Example V where a dispersion of white particles, sufficiently large to be visually distinguishable, is mixed with the analogous small particle black dispersion of Example III. Both dispersions employ the same film former (acrylic latex) and the same dispersing medium, the particle size being altered by the degree of agitation and by changing the proportion of hydrophilic colloid and type of insolubilizing agents in the dispersed phase. As will be apparent, small particle dispersions of other types can also be mixed with appropriate dispersions of visually distinguishable particles, having either the same or different types of film formers.

The examples illustrate the capacity of the present coating compositions to provide thick films in a single application, with less sagging tendency than experienced with comparable application of conventional coatings. This characteristic is especially notable in Example V, which comprises not only small particle agglomerates to provide good hiding, but also substantial proportions of particles larger than 25 microns. This content of larger particles particularly increases the capacity of the dispersion to provide thick, durable films in a single application. These advantages are inherent in both single color and multicolor dispersions.

Dry powders can be prepared by drying the compositions of the present examples, such as by a conventional spray drying process.

EXAMPLE I

Film forming dispersion of water thinnable alkyd resin paint

Composition A—White water thinnable alkyd resin base:

| | Parts by weight |
|---|---|
| Water thinnable alkyd resin, 42% solids (Arolon 580, Ashland Chemical Co.) | 52.5 |
| Titanium dioxide | 42.0 |
| Anionic polymeric pigment dispersing agent, 25% solids (Tamol 731) | 1.6 |
| Water | 3.7 |
| Drier, 6% cobalt ("Emulsive" drier, Witco Chemical Co.) | 0.2 |
| Total | 100.0 |

Composition B—Small particle water thinnable alkyd resin paint dispersion:

| | Parts by weight |
|---|---|
| Composition A | 48.7 |
| Nonionic guar gum derivative, 1.5% solution in water (Polymer 1212A, Stein, Hall & Co.) | 3.4 |
| Bentonite colloidal clay, high swelling sodium type, 10% dispersion in water | 14.6 |

The guar derivative and bentonite were added successively, with stirring, to composition A. The following mixture was then added as a dispersing medium:

| | |
|---|---|
| Bentonite, 10% dispersion in water | 10.0 |
| Ammonium biborate, 5% solution water | 3.3 |
| Water | 20.0 |
| Total | 100.0 |

Moderate stirring produced a dispersion of particles predominantly smaller than 25 microns.

Composition B produced a white alkyd resin film on brushing onto a surface.

This example illustrates the use of the principles disclosed hereinabove to convert a viscous, organic, water thinnable solution coating to an aqueous dispersion coating. Although composition B was relatively viscous, it was easily brushed or sprayed because of the thixotropic character which is typical of many dispersions.

EXAMPLE II

Film forming dispersion of water soluble alkali silicate
Composition A—Clay dispersion in water:

| | Parts by weight |
|---|---|
| China clay | 60.0 |
| Sodium tripolyphosphate, 10% solution in water | 0.8 |
| Water | 39.2 |
| Total | 100.0 |

Composition B—Small particle water soluble alkali silicate dispersion:

| | Parts by weight |
|---|---|
| Aqueous potassium silicate solution, 40.75° Baume (Kasil #6, Philadelphia Quartz Co.) | 52.4 |
| Potassium hydroxide | 0.3 |
| Nonionic guar gum derivative, 0.75% solution in water (Jaguar J2S1, Stein, Hall & Co.) | 10.5 |

These ingredients were well mixed before addition of the following mixture, which served as a dispersing medium:

| | |
|---|---|
| Composition A | 15.8 |
| Borax, 1.5% solution in water | 5.2 |

Moderate stirring produced a dispersion of particles predominantly larger than 25 microns. Addition was then made of composition A — 15.8

Total — 100.0

Further vigorous stirring produced a dispersion of particles predominantly smaller than 25 microns.

On brushing onto a surface, composition B produced a fire resistant, semi-translucent alkali silicate film.

This example illustrates the conversion of a viscous, inorganic solution coating to an aqueous dispersion coating which can be readily brushed or sprayed.

In this composition, china clay was used in preference to more active colloidal clays, which showed some tendency to precipitate the water soluble alkali silicate. The addition of potassium hydroxide also served to reduce any precipitation tendency of the primary film former.

EXAMPLE III

Film forming dispersion of acrylic latex paint

Composition A—Black acrylic latex base:

| | Parts by weight |
|---|---|
| Acrylic latex, 46% solids (Rhoplex AC–34) | 38.6 |
| Nonionic guar gum derivative, 1.5% solution in water (Jaguar J2S1, Stein, Hall & Co.) | 11.6 |

These ingredients were well mixed, then combined with the following pigment dispersion:

| | |
|---|---|
| Black iron oxide | 14.2 |
| China clay | 14.2 |
| Hydrous magnesium silicate (Ben-A-Gel EW) | 0.4 |
| Anionic polymeric pigment dispersing agent, 25% solids (Tamol 731) | 1.1 |
| Water | 19.9 |

Total — 100.0

Composition B—Dispersing medium:

| | Parts by weight |
|---|---|
| Hydrous magnesium silicate, 4% dispersion in water (Ben-A-Gel EW) | 25 |
| Ammonium biborate, 5% solution in water | 5 |
| Carboxymethyl cellulose, high viscosity, 1% solution in water (Cellosize CMC P–75–XH) | 25 |

This mixture was stirred vigorously until thickening occured, then thinned with water:

| Water | 45 |
|---|---|

Total — 100

Composition C—Small particle black acrylic latex paint dispersion:

| | Parts by weight |
|---|---|
| Composition A | 68 |
| Composition B | 27 |
| Hydrous magnesium silicate, 4% dispersion in water (Ben-A-Gel EW) | 5 |

Total — 100

Compositions A and B were mixed and stirred with moderate agitation until the desired average particle size was approached. After addition of the hydrous magnesium silicate, stirring was continued until the majority of particles were smaller than 25 microns.

Composition C produced a black acrylic resin film on application to a surface by spraying or brushing.

In this composition the effectiveness of the hydrous magnesium silicate as an insolubilizing agent in composition B is apparently increased by the presence of the carboxymethyl cellulose, possibly because it improves the state of subdivision of the colloidal silicate.

EXAMPLE IV

Film forming dispersion of starch paint

Composition A—Red starch base:

| | Parts by weight |
|---|---|
| Starch (Staramic 211, A. E. Staley Mfg. Co.) | 11.9 |
| Cationic derivative of starch (Cato 8, National Starch Products, Inc.) | 0.6 |
| Water | 59.5 |

The starch solution was prepared by stirring in warm water, then combined with the following pigment dispersion:

| | |
|---|---|
| Red iron oxide | 9.3 |
| China clay | 9.3 |
| Anionic polymeric pigment dispersing agent, 25% solids (Tamol 731) | 0.6 |
| Water | 8.8 |

Total — 100.0

Composition B—Small particle starch paint dispersion: Composition A was mixed with equal parts of a 0.25% solution of ammonium biborate in water. Moderate stirring produced a dispersion of particles predominantly smaller than 25 microns.

Composition B produced a red starch film on brushing onto a surface.

This example illustrates the conversion of a high viscosity solution coating into a dispersion coating which can be admixed with many other film formers, and can be sprayed or brushed.

In this example, pigment wetting and insolubilization of the hydrophilic colloid were improved by use of a portion of cationic modified starch in combination with unmodified starch.

EXAMPLE V

Multicolor acrylic latex coating composition

This example employs the small particle black latex paint dispersion of Example III as one color of a multicolor coating composition.

Composition A—White acrylic latex base:

| | Parts by weight |
|---|---|
| Acrylic latex, 46% solids (Rhoplex AC–34) | 38 |
| Nonionic guar gum derivative, 1.5% solution in water (Jaguar J2S1, Stein, Hall & Co.) | 28.5 |

These ingredients were well mixed, then combined with the following pigment dispersion:

| | |
|---|---|
| Titanium dioxide | 5.7 |
| China clay | 6.7 |
| Talc | 6.7 |
| Anionic polymeric pigment dispersing agent, 25% solids (Tamol 731) | 1.1 |
| Water | 13.3 |

Total — 100.0

Composition B—Large particle white acrylic latex paint dispersion:

| | Parts by weight |
|---|---|
| Composition A | 60 |
| Dispersing medium: same as Composition B of Example III | 40 |

Total — 100

The two components were mixed and stirred mildly to produce a dispersion of relatively large particles, readily visible to the naked eye.

Composition C—Multicolor black-white acrylic latex paint dispersion:

| | Parts by weight |
|---|---|
| Small particle black acrylic latex paint dispersion (Composition C of Example III) | 67 |
| Large particle white acrylic latex paint dispersion (Composition B of present example) | 33 |
| Total | 100 |

The mixture of the two dispersions was stirred mildly to provide a uniform dispersion and give the desired average particle size of white particles.

On application by brush, composition C produced a somewhat directional multicolor pattern of readily visible white flecks against a black background.

A black and white dispersion comparable to composition C was prepared by mixing, in the indicated proportion, composition B and a black acrylic latex paint containing the same pigment to binder ratio as composition A of Example III. On application in the same manner as said composition C, the film formed from this comparable dispersion showed substantially less color contrast, and greater coverage of white particles by the black paint.

In a single spray application, composition C readily produced dry films two or three times as thick as those which can be formed by one-coat application of conventional latex paints.

Mixed dispersions equivalent to composition C are readily produced by successive addition of the film forming bases to the dispersing medium, as well as by the mixture of complete dispersions indicated above. When the two dispersion bases are to be added successively to the same portion of dispersing medium, it is convenient to form the small particle dispersion first, and thereafter to add the dispersion base which is to constitute the larger particles.

EXAMPLE VI

Dispersion coating with aqueous emulsion film former in dispersing medium

A coating composition was prepared by mixing 3 parts by weight of composition C, Example III, with 1 part of clear acrylic latex (Rhoplex AC-34). On application to a surface, this composition provided a film having less texture and more gloss than the film formed from said composition C.

EXAMPLE VII

Dispersion coating with aqueous solution film former in dispersing medium

Low cost coating materials can be upgraded in a unique manner by combining dispersions prepared according to the present methods with conventional aqueous coatings which tend to overlay the dispersed materials upon application.

In this example a small particle starch coating was simply mixed with a clear aqueous solution coating (RF–6318, Monsanto) containing added drier. RF–6318 is maleic anhydride adduct of a linoleic acid ester of a styrene allyl alcohol copolymer, solubilized with amines and a glycol ether.

| | Parts by weight |
|---|---|
| Composition B of Example IV | 66.7 |
| RF–6318, thinned with water to 33% solids | 33.0 |
| Drier, 6% cobalt ("Emulsive" drier, Witco Chemical Co.) | 0.3 |
| Total | 100.0 |

On application and drying, the film formed from this composition showed substantially less water sensitivity than the unmodified film of Example IV.

EXAMPLE VIII

Mixture of small particle dispersions

A white acrylic latex paint dispersion equivalent to that of Example III was prepared by using titanium dioxide in place of black iron oxide. A composition (A) was made by mixing equal parts of this small particle white dispersion with the black dispersion of Example III.

A composition (B) was prepared, comprising a conventional mixture of black and white paints having the same pigmentation as composition A. This was done by simply mixing equal parts by weight of the black and white dispersion bases before dispersion.

The films formed by spray application of compositions A and B were apparently monochromatic, but differed in appearance, composition A being several shades brighter than composition B.

A similar comparison was made by mixing equal portions of pastel blue and yellow paints of approximately equal chroma and brightness. As compared with the conventional mixture, the film formed from the mixture of dispersions was substantially brighter, somewhat bluer in hue, and lower in chroma.

I claim:

1. A substantially odor-free liquid coating composition for imparting a decorative coating to a desired surface, which composition is homogeneous in appearance when viewed by the naked eye at a normal reading distance and which consists essentially of:
   (a) a first flowable colored phase comprising an aqueous hydrophilic colloid film former,
   (b) a second flowable aqueous phase of a color different from that of said first phase,
   (c) an insolubilizing agent for said hydrophilic colloid film former present in at least one of said first and second phases and in such quantity as to render said first and second phases substantially insoluble in one another,
   said first phase being in the form of a plurality of discrete minute globules being within a size range greater than colloidal but less than twenty-five microns so as not to be visible to the naked eye at a normal reading distance, whereby said composition when applied to said surface provides a decorative coating thereon having said homogeneous appearance.

2. The coating composition of claim 1 wherein said first colored phase comprises first and second portions having first and second colors that cooperatively impart a third color intermediate said first and second colors.

3. The composition of claim 2 wherein the globules comprising said first and second portions of said first colored phase are semi-liquid to gelatinous in consistency and have a tendency to coalesce with one another, with said globules so coalescing to form a continuous, homogeneous non-porous film after said composition is applied to said substrate and said second phase evaporates therefrom.

4. The composition of claim 1 which further includes a plurality of minute first particles of an organic film former that has predetermined physical coating characteristics, said particles being substantially less than twenty-five microns in size, and at least a portion of said globules including said particles as an integral part thereof.

5. The composition of claim 4 wherein said particles are latex-like in structure.

6. The composition of claim 4 in which said hydrophilic colloid film former and said particles are of first and second different colors that cooperatively impart a third color intermediate said first and second colors to said composition and said layer that is different in chroma, hue and depth than that obtained by intimately mixing said hydrophilic colloid film former and said organic film former of said first and second colors and applying the same as a layer to said substrate in a non-dispersed state.

7. The composition of claim 1 which further includes a first water thinnable organic film former in said second phase that is of a color visibly distinct from that of said first phase, with said composition when applied as said layer to said substrate imparting a colored appearance thereto that is different in chroma, hue and depth than that obtained when said first and second phases are intimately mixed and applied to said substrate in a non-dispersed form.

8. The composition of claim 1 which further includes a second water thinnable film former in said discrete particles.

9. The composition of claim 8 wherein said second water thinnable film former is selected from a group consisting of organic resin latices and emulsions, water dispersible oils, and water reducible solutions of natural and synthetic polymers and natural polymer derivatives.

10. The composition of claim 8 for imparting a fire-resistant decorative coating to a desired surface wherein said second water thinnable film former is selected from a group consisting of water soluble alkali silicates, water dispersible ceramic frits and non-fritted ceramic minerals.

11. A dry granular material capable of being reconstituted by the addition of an aqueous medium to provide an aqueous, substantially odor-free homogeneous coating composition, which material is produced by drying a composition as defined in claim 1.

References Cited
UNITED STATES PATENTS

| | | | |
|---|---|---|---|
| 2,228,158 | 1/1941 | Teale | 252—311 |
| 3,007,879 | 11/1961 | Jordan | 252—311 |
| 3,458,328 | 7/1969 | Zola | 106—170 |

ALLAN LIEBERMAN, Primary Examiner

U.S. Cl. X.R.

106—47, 74, 81, 84, 158, 170, 207, 208, 213; 287 R; 260—8, 13, 17 R, 17.4 R, 18 R, 23 R, 24, 29.2 R, 29.6 R

UNITED STATES PATENT OFFICE
CERTIFICATE OF CORRECTION

Patent No. 3,725,089            Dated April 3, 1973

Inventor(s) John C. Zola

It is certified that error appears in the above-identified patent and that said Letters Patent are hereby corrected as shown below:

The term of this patent subsequent to July 29, 1986, has been disclaimed.

Signed and Sealed this

Sixteenth Day of November 1976

[SEAL]

Attest:

RUTH C. MASON
*Attesting Officer*

C. MARSHALL DANN
*Commissioner of Patents and Trademarks*